United States Patent [19]
Goldsmith

[11] Patent Number: 5,269,337
[45] Date of Patent: Dec. 14, 1993

[54] WATER CONTROL APPARATUS

[76] Inventor: Aaron Goldsmith, 23918 Park Grenada, Calabasas, Calif. 91302

[21] Appl. No.: 845,378

[22] Filed: Mar. 3, 1992

Related U.S. Application Data

[63] Continuation-in-part of Ser. No. 645,660, Jan. 25, 1991, Pat. No. 5,117,855, which is a continuation-in-part of Ser. No. 500,026, Mar. 27, 1990, Pat. No. 4,987,915.

[51] Int. Cl.$^5$ ............................................. F16K 17/36
[52] U.S. Cl. .................... 137/78.3; 137/895; 137/907; 251/65; 239/63
[58] Field of Search ............ 137/78.3, 907, 895, 137/564.5, 543.15; 239/63; 251/65

[56] References Cited

U.S. PATENT DOCUMENTS

| | | | |
|---|---|---|---|
| 2,0943,842 | 9/1937 | MacLean | 137/502 |
| 1,125,342 | 1/1915 | King | 137/895 |
| 1,181,356 | 5/1916 | Thompson et al. | |
| 1,386,036 | 8/1921 | Weeks | |
| 1,725,374 | 8/1929 | Rush | 137/486 |
| 2,066,544 | 1/1937 | Shaw | 261/62 |
| 2,297,736 | 10/1942 | Aymar | 261/51 |
| 2,809,660 | 10/1957 | Becker | 137/543.15 |
| 2,829,664 | 4/1958 | Mountford | 137/502 |
| 3,119,408 | 1/1964 | Patrick | 137/543.15 |
| 3,361,161 | 1/1968 | Schwartz | 137/604 |
| 3,863,698 | 12/1958 | Richards | 239/63 |
| 3,910,300 | 10/1975 | Tal | 137/78.3 |
| 3,940,460 | 2/1976 | Graybill | 261/40 |
| 3,949,025 | 4/1976 | Englert et al. | 261/62 |
| 3,981,446 | 9/1976 | Hunter | 137/78.3 |
| 4,001,356 | 1/1977 | Graybill | 261/144 |
| 4,055,200 | 10/1977 | Lohoft | 137/624.11 |
| 4,108,419 | 8/1978 | Sturman et al. | 251/65 |

FOREIGN PATENT DOCUMENTS 170016 1/1960 Netherlands ............ 137/564.5

Primary Examiner—A. Michael Chambers
Attorney, Agent, or Firm—Lewis Anten

[57] ABSTRACT

A water control apparatus having a main valve, a main valve control, and a step-wise valve. A moisture sensor is connected to the valve control. In response to the moisture sensor, the valve control opens or closes the main valve. When the main valve opens, sufficient water pressure must be present for the step-wise valve to open. When said step-wise valve opens, water flows through it and to a water distribution device that makes the moisture sensor moist. When the moisture sensor is sufficiently moist, the valve control turns the main valve off. With the main valve off, the lack of water pressure closes the step-wise valve. The step-wise valve opens at a higher water pressure threshold and closes at a lower water pressure threshold. The decrease in pressure arising from the opening of the step-wise valve is insufficient to close it. The water control apparatus is powered by water flow and is otherwise self-sufficient.

24 Claims, 8 Drawing Sheets

WATER CONTROL APPARATUS

CROSS-REFERENCE TO RELATED APPLICATIONS

This application is a continuation-in-part of U.S. patent application Ser. No. 07/645,660 filed Jan. 25, 1991 now U.S. Pat. No. 5,117,855 which is a continuation in part Ser. No. 500,026, filed Mar. 27, 1990, of U.S. Pat. No. 4,987,915 issued Jan. 29, 1991.

BACKGROUND OF THE INVENTION

1. Field of the Invention

This invention relates to water control devices, and more particularly to water control devices that sense o detect the moisture in a surrounding area and that activate according to the applied water pressure.

2. Description of the Related Art

In some instances, it is necessary to automatically turn hydraulic or water systems on, but perhaps due to the presence of several devices supplied by the same water source, the pressure is not sufficient for all of them to operate simultaneously. When there are many units installed in parallel, as in irrigation or sprinkler systems, it is most advantageous to have all units attached to a single water source.

In the underlying parent applications, an automatic water control device was set forth that controlled water flow according to need as sensed by a sensor. A venturi device created a region of low pressure that was transmitted to a pressure sensitive valve housing that was in turn connected to the sensor. Presence or absence of ambient pressure controlled the flow of water through the valve device. No outside energy source was necessary for switching the apparatus from on to off states, or vice-versa, allowing local control of the distribution of water through the control device. Energy for the control device was derived from pressurized water flowing both through and past the control device.

SUMMARY OF THE INVENTION

The present invention provides an improved water control apparatus that delivers water according to need while preventing excessive water pressure demands when several of the water control apparatuses are on the same supply line. When several units are installed in parallel, a step function for watering is provided that turns on only as many units as the water pressure will allow, allowing those units to satisfy their demands for water, turning off those operating units, and turning on other unsatisfied units once the first ones have turned off. In this manner, independent units with independent water requirements can all be met without overly depleting available water pressure.

A water valve sensitive to water pressure in a step-wise fashion is connected to a main water valve of conventional design. A main valve control sensitive to air pressure controls water flow through the main water valve. When the main water valve is open, the water pressure on the step-wise valve must be sufficient to open it in order for water to flow past it. Once opened, the step-wise valve remains open until the main valve control closes the main water valve, or until the water pressure falls below a certain, lowered threshold. The main valve control closes the main water valve when the irrigation or water requirements have been satisfied as detected by a moisture sensor. When the main water valve is closed or the lower water pressure threshold is reached, the water pressure on the step-wise valve is insufficient to keep it open and the step-wise valve closes.

The main water valve has a pilot chamber that controls the operation of the main water valve. When water flows through the pilot chamber the main valve opens and remains open. When water ceases to flow through the pilot chamber, the main valve closes and stays closed.

Water flow through the pilot chamber is controlled by a magnetic plug to which a spring is attached. The magnetic plug can move up or down within the main valve control, but is biased downward by the spring. The magnetic plug and its spring are kept in a watertight cavity formed between the main valve and the main valve control. When the magnetic plug is down, it seals the inlet to the pilot chamber to close the main water valve. When the magnetic plug is up, water flows through the pilot chamber and the main water valve opens.

Within the main valve control, a diaphragm splits a valve control chamber into two portions. The lower portion is maintained at ambient air pressure while the upper portion undergoes variable air pressures from ambient air pressure to significantly reduced air pressures. The diaphragm is urged away from the top of the valve control chamber by a diaphragm spring and has a magnet on its underside that can attract the magnetic plug away from the pilot chamber inlet, overcoming the bias of the plug spring, and opening the main water valve.

The upper valve control chamber communicates with a venturi and a porous air flow element that acts as a moisture sensor. When water flows past the venturi, a region of low pressure is generated that is transmitted to the upper valve control chamber and the moisture sensor. When the moisture sensor is wet, no air is allowed to flow through it. When the moisture sensor is dry, air is permitted to flow through it. According to the air flow through the moisture sensor, the moisture level of the area surrounding the moisture sensor can be determined.

If, when water flows past the venturi, the moisture sensor is dry, air flows through the moisture sensor in response to the vacuum pulled by the venturi. With the air flowing through the moisture sensor, no appreciable reduction in air pressure is generated within the upper valve control chamber and the spring-biased diaphragm with the magnet descends within the chamber to pull the magnetic plug up and away from the inlet of the pilot chamber, allowing the main valve to open.

However, if the moisture sensor is wet, no air flows through it and the pressure is reduced inside the upper valve control chamber when water flows past the venturi. When the pressure is sufficiently reduced inside the upper valve control chamber, the diaphragm with its magnet ascends within the valve control chamber, overcoming the bias of the diaphragm spring. When the diaphragm ascends and breaks the magnetic attraction between the magnet and the magnetic plug, the magnetic plug descends to close off the inlet to the pilot chamber, closing the main valve.

When no water is flowing past the venturi, a check valve maintains the lowered air pressure within the upper valve control chamber until the moisture sensor dries out and air flows through it to the valve control chamber, allowing the diaphragm to descend and open the main valve.

Also incorporated into the present invention is a step-wise water-pressure-sensitive water valve. The step-wise water valve opens and closes according to the water pressure exerted on the step-wise valve. The pressure threshold for opening the step-wise valve is higher than the pressure threshold for closing the step-wise valve. The decrease in water pressure that occurs when the step-wise valve first opens and water flow begins is not a sufficient reduction in pressure to close it. The step-wise valve closes when the moisture sensor senses that sufficient water has been distributed by becoming moist. The moisture sensor then cuts off the air supply to the main valve control, which in turn shuts off the water flow t the step-wise valve by closing the main valve. The shut off of the water flow by the main valve is a sufficient reduction in pressure to allow the step-wise valve to close.

The step-wise water valve of the present invention has a venturi or valve orifice. When water flows through the venturi, the reduced area of the venturi forces the water to flow faster and creates a local region of reduced pressure that is below the ambient atmospheric pressure. The venturi is kept closed by a ballcock-like plunger. The plunger fits into the venturi from the downstream side of it. The plunger is shaped to enhance the flow of water around it.

The plunger is held against the venturi by two springs, a coil spring and a Belville spring. The plunger moves towards and away from the venturi by means of these springs. When the water pressure is sufficient, the plunger is pushed away from the venturi and presses on the springs. When pressed sufficiently, the Belville spring snaps back with the plunger following it into the valve chamber. As the upward or restoring force of the Belville spring is lessened when it is snapped back, the decrease in water pressure that occurs when the valve opens is not sufficient to allow the Belville spring to push the plunger back into its seated position against the venturi. Water continues to flow once the valve is open and the Belville spring is pushed back.

A venturi output transmits the lowered pressure present near the venturi to the main valve control and the moisture sensor. When sufficient moisture has been distributed around the sensor, it becomes moist and the decrease in pressure created by the vacuum pulled by the venturi increases until the main valve control shuts off the flow of water through the main valve and consequently to the step-wise valve. When the water flow is shut off to the step-wise valve, the plunger is pushed back against the venturi by the Belville spring. When the main valve control allows water to flow through the main valve once again, the water pressure must be sufficiently high to open again the step-wise valve for water to flow through the system.

In order to adjust the step-wise valve, an adjusting bolt or screw is used that threads into the valve. The adjusting bolt has an extension pin the passes through the springs and their supports, and into a cavity within the plunger. The pin aligns the plunger and associated structures as they move within the step-wise valve. By moving the adjusting bolt in or out, the support for the Belville spring is moved to adjust the relative position between the Belville spring and the plunger, controlling the force of the springs against the plunger.

By the action of the plunger seating and unseating itself from the venturi, a self-purging valve is also provided.

OBJECTS OF THE INVENTION

It is an object of this invention to provide means by which several water distribution devices can be connected to the same water supply without having the demand of the water distribution devices exceed or nearly exceed the pressure from the water supply.

It is an object of this invention to provide locally powered means for opening and closing a valve.

It is another object of the present invention to provide means by which a minimum pressure is always present on a water line connected to several demand sources.

It is another object of the present invention to provide a pressure-sensitive valve that opens when the water pressure exceeds a certain higher threshold and closes when the water pressure falls below a certain minimum threshold, yet remains open when the water pressure drops as the water begins to flow through the valve.

It is another object of this invention to provide a replacement for a solenoid typically used for valve control in water distribution systems.

It is yet another object of this invention to provide moisture sensitive control means for a water distribution device.

It is yet another object of this invention to provide a water valve that is efficient and reliable.

It is yet another object of this invention to provide a pressure-sensitive water valve that is self-purging.

These and other objects and advantages of the present invention will be apparent from a review of the following specification and accompanying drawings.

DESCRIPTION OF THE PREFERRED EMBODIMENTS

Figure 1:
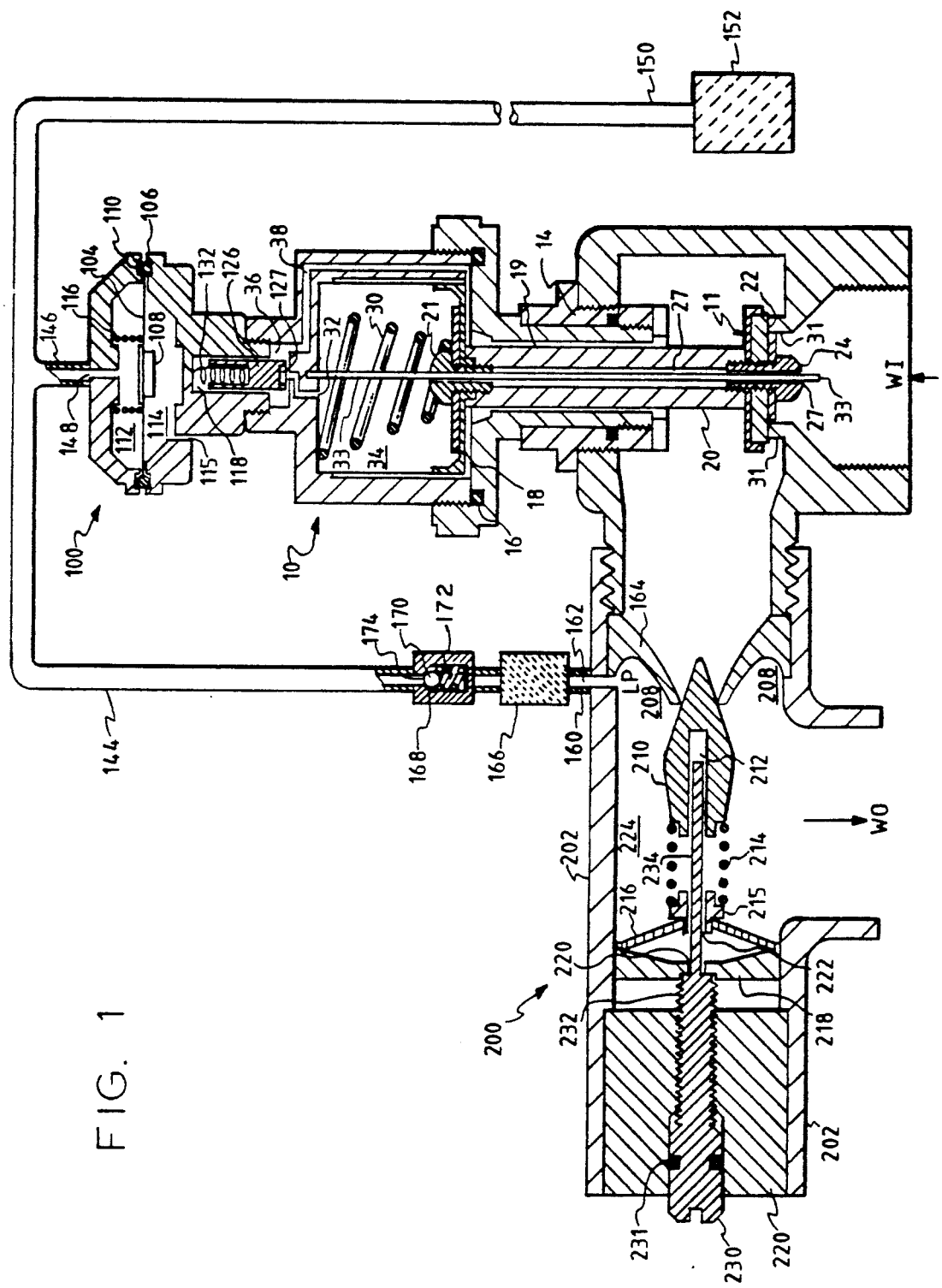
FIG. 1 is a cross-sectional view of the water control apparatus of the present invention when it is closed.
Figure 2:
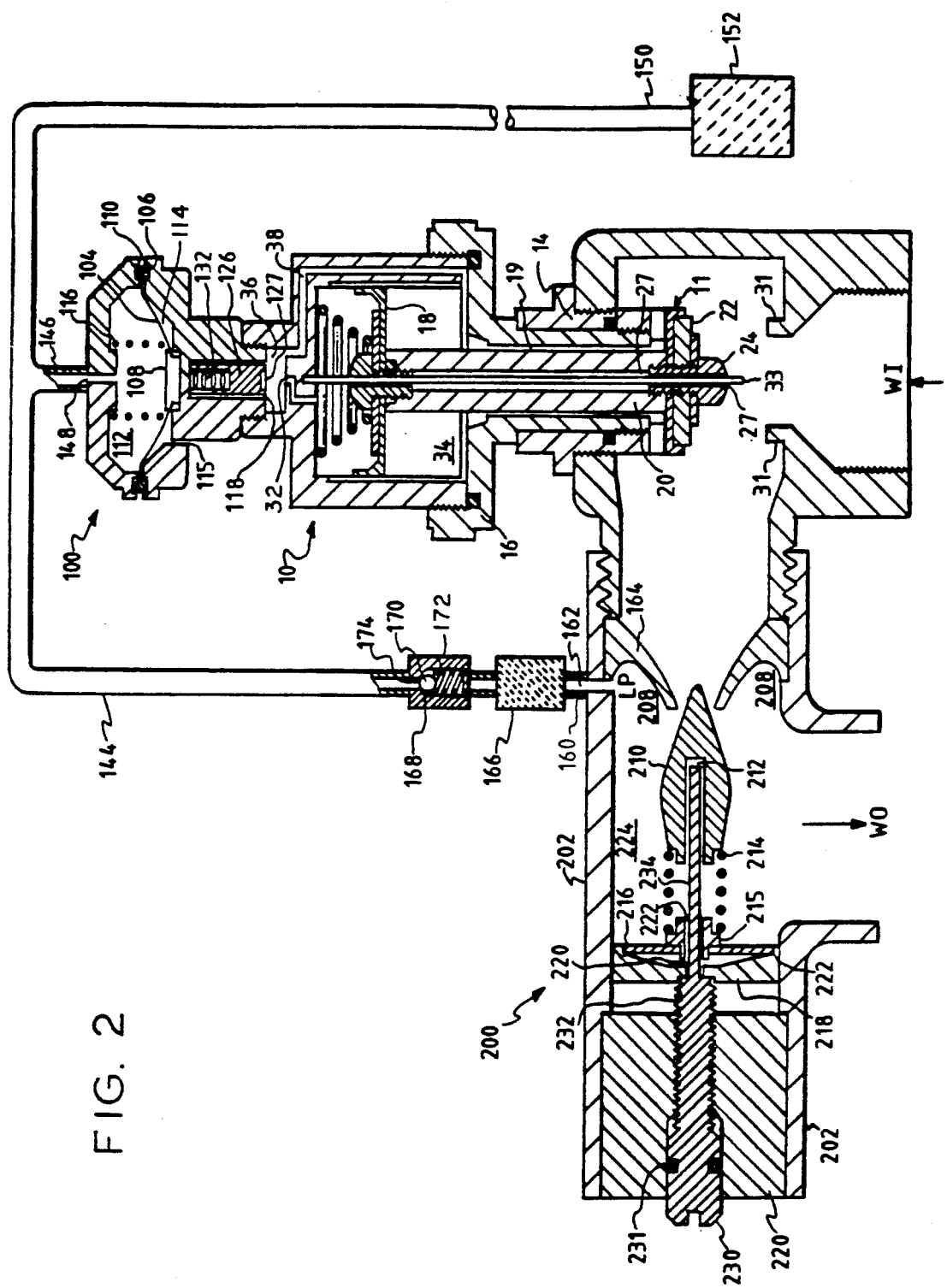
FIG. 2 is a cross sectional view of the water control apparatus of the present invention when it is open.

Referring to FIGS. 1 and 2, cross sections of the water control apparatus of the present invention are shown for open and closed positions, respectively. A main valve assembly 10 is connected to and controlled by an air-pressure sensitive valve control 100. The main valve assembly is also connected to a step-wise water-pressure-sensitive valve assembly 200, to which water flowing through the main valve assembly 10 is passed.

The main valve assembly 10 is of conventional design and includes a main valve 11, and a lower tubular portion 14 which is threaded to the assembly 10 and sealed thereto by means of an O-ring 16. A piston 18 slides within the valve assembly 10. A valve stem 20 is attached to the piston 18 by means of a screw 21. The valve stem 20 extends through the bottom of the piston 18 and through the lower tubular portion 14 of the main valve assembly 10.

The main valve 11 has a valve member 22 which is mounted to the bottom of the valve stem 20 by means of a screw 24. A bleed port 27 extends longitudinally through the valve stem 20 and through the screws 21 and 24. The bleed port 27 supplies water from upstream of the main valve 11 to the interior 34 of the main valve assembly 10. A spring 30 within the main valve assembly 10 biases the piston 18 towards the bottom of the main valve chamber 34.

The tubular portion 14 is intended to be mounted in a valve assembly of the usual anti-siphon type of valve, and the valve member 22 seats against a valve seat 31 when the piston 18 is displaced to the bottom of the main valve chamber 34. The spring 30 biases the main valve assembly 10 closed. A pin 33 runs from the top of the valve assembly 10 through the spring 30, and the bleed port 27 including the screw 21, the valve stem 20, and the screw 24. The pin 33 serves to keep the moving main valve parts properly aligned.

Water enters the main valve chamber 34 through the bleed port 27 and establishes hydraulic pressure against the top of piston 18, pushing it downward. Due to the fact that the area of piston 18 is greater than the area of the valve member 22, the resulting hydraulic action as well as that of the spring 30 holds the main valve 11 closed.

A pilot chamber inlet 32 extends from the upper end of the main valve chamber 34 an into the pilot chamber 36 at the bottom of the valve control 100. A pilot chamber outlet 38 leads from the pilot chamber 36 to a chamber 19 in the main valve assembly 10 beneath the piston 18.

The pilot chamber 36 allows the main valve assembly 10 to be controlled by automatic means, such as a solenoid or the valve control means 100 of the present invention. When water is prevented from flowing through the pilot chamber 36, the main valve assembly 10 will remain closed as no pressure is transmitted past the main valve chamber 34. However, when water is allowed to flow through the pilot chamber 36, hydraulic pressure is transmitted through the pilot chamber 36 to the chamber 19 beneath the piston 18. The upward pressure present below the piston 18 and the valve member 22 of the main valve assembly 10 is sufficient to overcome the downward pressures (hydraulic and the spring 18) present on the piston 18. The imbalance in forces arising from the different hydraulic pressures and the spring 30 allows the piston 18 to rise within the main valve chamber 34, opening the main valve 11 and allowing water flow past it.

Figure 3:
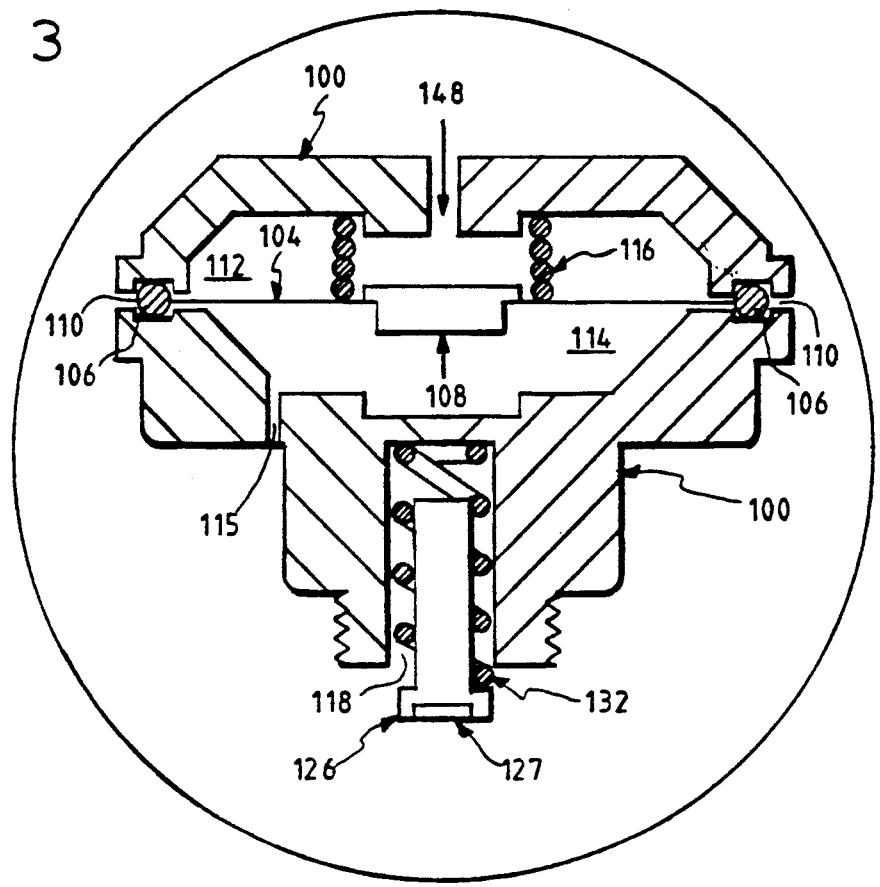
FIG. 3 is a cross sectional view of the valve control of the present invention in the position attained when the main valve is closed.
Figure 4:
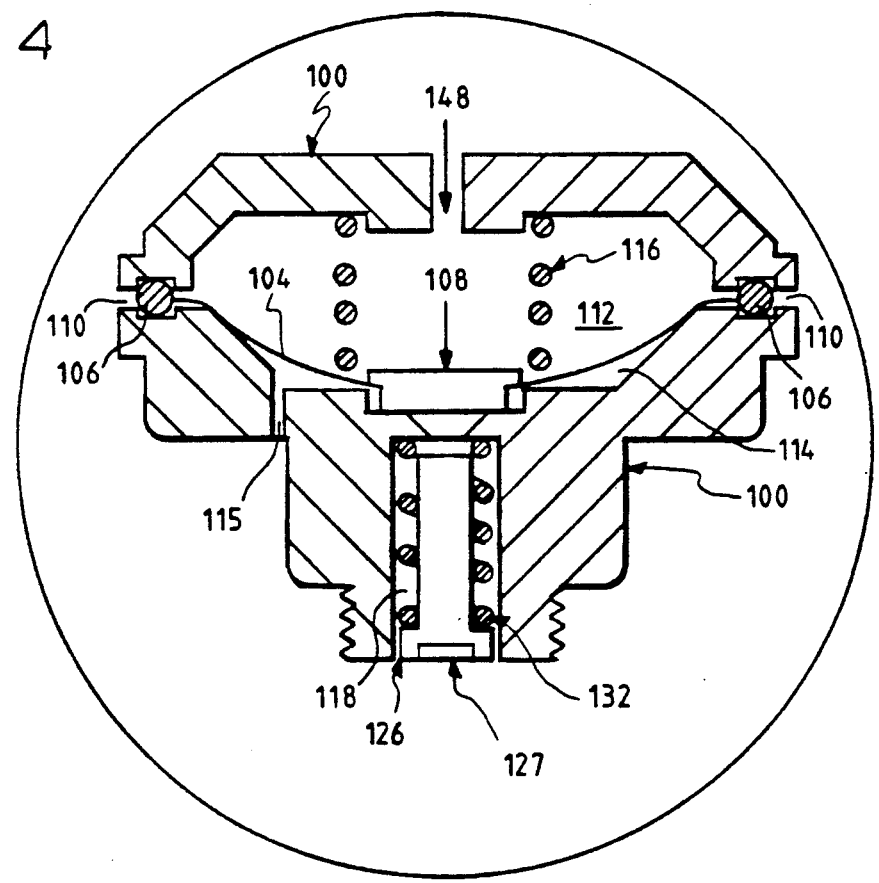
FIG. 4 is a cross sectional view of the valve control of the present invention in the position attained when the main valve is open.

The valve control 100 of the present invention is shown in FIGS. 3 and 4. The valve control 100 is sensitive to air pressure and controls the flow of water through the pilot chamber 36, and so controls the operation of the main valve assembly 10. The valve control 100 has a diaphragm 104 with an O-ring seal 106 fitted within an annular cavity 110 defined between upper and lower housing portions of the valve control assembly 100. The diaphragm 104 is biased downward by a spring 116 and divides the valve control 100 into an upper chamber 112 in which the air pressure may vary and a lower chamber 114 which is always kept at ambient air pressure by an aperture 115 in the valve control 100.

A magnet 108 is centrally located on the underside of the diaphragm 104. The magnet 108 follows the motion of the diaphragm 104 as it moves up and down within the confines of the valve control 100. The magnet 108 may be attached to the diaphragm 104 by a plate connected to the magnet 108, but located on the topside of the diaphragm 104.

The lower part of the valve control 100 has a cavity 118 which acts as an extension of the pilot chamber 36 of the main valve assembly 10. The valve control cavity 118 is entirely separate from the upper and lower valve control chambers 112, 114. In this valve control cavity 118, a magnetic plug 126 moves up and down in response to the position of the diaphragm 104 and the magnet 108. To be attracted to the magnet 108, the magnetic plug 126 may be made of a ferromagnetic material such as iron or steel, or may incorporate a magnet at its spring end. The attractive force generated between the magnet 108 and the magnetic plug 126 is substantial, allowing the magnetic plug 126 to be relatively either light or heavy. The magnetic plug 126 has a flexible, resilient tip 127 at the lower end of the magnetic plug 126 to provide a secure seal over the pilot chamber inlet 32.

The magnetic plug 126 is normally spring-biased downward by spring 132 so that plug 126 covers the pilot chamber inlet 32 and blocks the flow of fluid through the pilot chamber 36. When the diaphragm 104 is located in its upper position, any attraction between the magnet 108 and the magnetic plug 126 is not sufficient to overcome the bias of spring 132 and to lift the magnetic plug 126 away from the pilot chamber inlet 32. When fluid does not flow through the pilot chamber 36, fluid is prevented from passing to the lower side of piston 18 thereby maintaining the main valve 11 in a closed position.

However, when the diaphragm 104 lowers, the magnet 108 on the underside of the diaphragm 104 is sufficiently close to the magnetic plug 126 to overcome the bias of plug spring 132 and to attract and pull the magnetic plug 126 away from the pilot chamber inlet 32. Fluid is then allowed to pass through the pilot chamber inlet 32 and into the pilot chamber 36, to chamber 19, and to the underside of piston 18. The water pressure present on the underside of piston 18 is sufficient to push piston 18 up, opening the main valve 11 which allows the free flow of fluid past the valve member 22 and valve seat 31.

The valve control 100 controls the movement of the magnetic plug 126 which controls the flow of water through the pilot chamber inlet 32 and into the pilot chamber 36. By controlling water flow in the pilot chamber 36, the valve control 100 controls the operation of the main valve assembly 10 and the flow of water through it.

Referring now to FIGS. 1 and 2, an air impervious tube 144 is connected to the upper valve control chamber 112 through an extension 146 connected to an opening 148 into the upper valve control chamber 112. A porous air flow element 152 acts as a moisture sensor and is connected at one end 150 of the air impervious tube 144. The other end 160 of the air impervious tube 144 is connected to a low pressure area LP at the output 162 of a venturi device 164 connected to the output of the main valve 11.

The valve control 100 is a reliable apparatus which may be readily used in existing water sprinkling systems currently adapted for solenoid controls. The valve control 100 and moisture sensor 152 do not require maintenance, supervision, or electrical components.

A high air resistance device 166 is inserted in the tube 144, as is a one-way check valve 168 consisting of a ball element 170 pressed by a spring 172 against seat 174. Alternatively, a Schraeder type valve may be used as a check valve 168.

The high air resistance device 166 is preferably ceramic and is only slightly pervious to air but may be of any configuration, construction, or material that permits only small amounts of air to slowly pass through the device, either by physical structure or by means of a valve configuration. The high air resistance device 166 communicates with the surrounding atmosphere and allows air to slowly enter into the tube 144. As the check valve 168 is between the high air resistance device 166 and pressure sensitive valve control 100, no increase in air pressure is transmitted to the valve control 100 from the high air resistance device 166. However, any decrease in air pressure can be transmitted from the venturi 164 through the high air resistance device 166 to the valve control 100.

The high air resistance device 166 serves as, and may be substituted by, a calibrated leak or a pressure regulator. When the venturi 164 draws a vacuum on the tube 144, the pull of the venturi 164 may overwhelm the moisture sensor 152 by demanding from it more air than it can supply. As any pressure decrease generated by the venturi 164 is communicated to the valve control 100, it is possible for the venturi to draw or pull a vacuum on the tube 144 that overwhelms the moisture sensor 152. As the valve control 100 shuts off the valve 10 when the air pressure is sufficiently reduced, the main valve assembly 10 may close off even though the moisture sensor 152 is dry and allowing air to flow into the upper valve control chamber 112 if the venturi 164 pulls more air than the moisture sensor 152 can supply.

The pores of the moisture sensor 152 are inherently small so that moisture may prevent the flow of air through it. Even when dry, there is a limit to which the moisture sensor 152 can supply air to the air impervious tube 144 and the upper valve control chamber 112. If the venturi 164 demands more air than the moisture sensor 152 can supply, the venturi 164 can still reduce the air pressure in the upper valve control chamber 112 below that of ambient air pressure. The vacuum pull of the venturi 164 may be so strong as to pull the diaphragm 104 and magnet 108 up and away from the magnetic plug 126, allowing the magnetic plug 126 to drop over the pilot chamber inlet 32 and to close the main valve assembly 10.

To prevent this anomalous situation, the high air resistance element 166 is used to relieve any dramatic pressure decrease generated by the venturi 164 and to provide a ceiling on the vacuum the venturi can pull from the air impervious tube 144. The high air resistance element 166 allows the venturi to transmit its vacuum to the valve control 100 without overwhelming the moisture sensor 152.

The moisture sensor 152 is porous and has a pore size of about 12 microns or smaller, so that air can pass through the pores when moisture is not present, but when moisture is present, the pores are blocked and prevent the passage of air. While a ceramic element is commonly used for these applications, other materials, such as plastic, having a similar pore size could also be used. Ceramic elements are disclosed in Crane U.S. Pat. No. 3,758,987.

The high air resistance element 166 has a pore size smaller than 12 microns, and preferably in the range of 6–8 microns. At this pore size, the flow of air through the pores is very restricted but not completely blocked, creating a resistance to the venturi's 164 vacuum pull in the air impervious tube 144 and dissipating some of the vacuum while transmitting enough vacuum to the upper valve control chamber 112 for orderly and effective operation.

Figure 5:
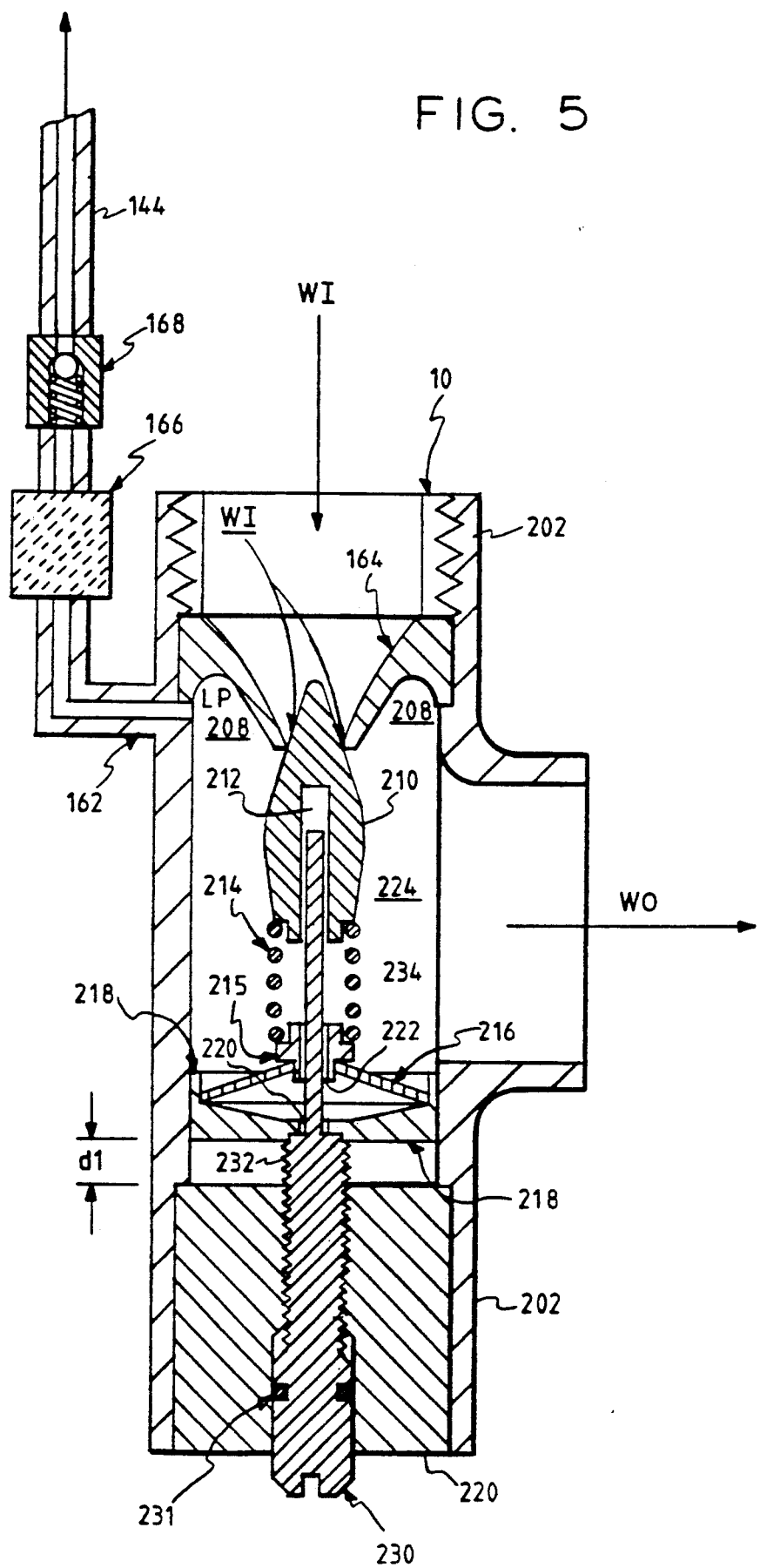
FIG. 5 is a cross-sectional view of the Belville valve assembly (step-wise water-pressure-sensitive valve) of the present invention in a closed position.
Figure 6:
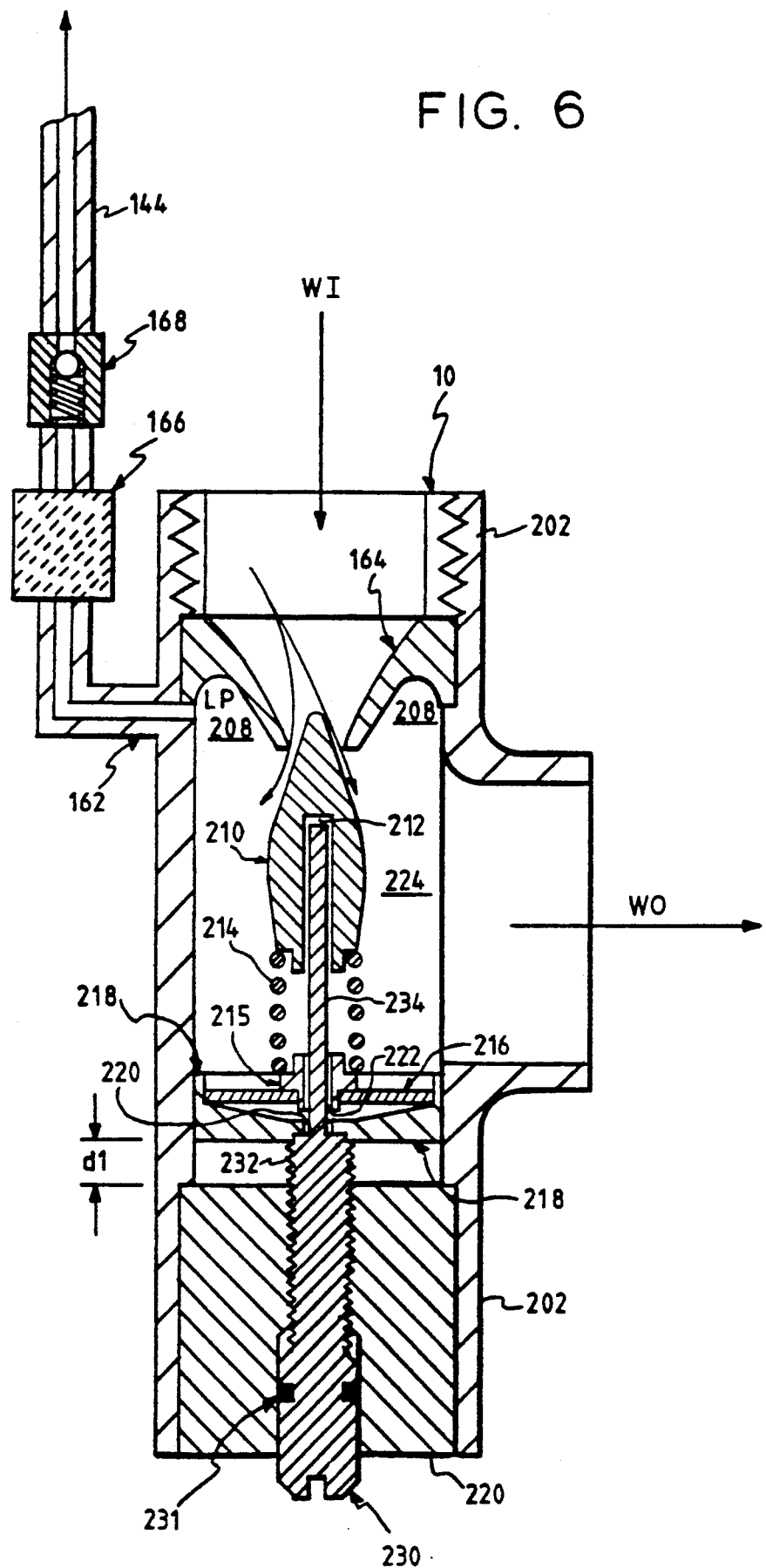
FIG. 6 is a cross-sectional view of the Belville valve assembly (step-wise water-pressure-sensitive valve) of the present invention in an open position.

As shown in FIGS. 5 and 6, the step-wise water-pressure-sensitive valve or Belville valve assembly 200 has a housing 202 that is connected to the outflow from the main valve assembly 10. A water outlet pipe WO allows water flowing into the Belville valve assembly 200 to exit.

At the entrance to the Belville valve assembly 200 is a circular valve orifice 164, or venturi, that slants downward and inward in a frustro-conicular fashion, creating an area of constricted water flow. Water flowing into the venturi 164 encounters a reduced area and as the same volume of water must flow past the constricted venturi area as for other areas in the water conduit, the water flows faster past the venturi 164. The faster flowing water accelerated by the venturi 164 flows into the Belville valve assembly 200 and creates a localized area of reduced pressure or vacuum LP. The venturi 164 is able to operate efficiently through a large range of water volumes and pressures.

The venturi 164 is indented or has a circular surrounding cavity on its downstream side along its base to form a venturi apex 208 into which water passing through the venturi 164 can flow as by eddy currents or backflow. Not only does water flow into the venturi apex 208, any pressure changes created by the venturi 164 are communicated to the general apex area 208.

On the downstream side of the venturi, a valve plunger 210 fits into the downstream side of the venturi 164. The valve plunger 210 is frustro-conicular in shape at its forward end and more cylindrical at its rear. The plunger 210 fits into the venturi 164, providing a watertight seal and preventing water flow. The plunger 210 has a hole 212 passing partially through it from its rear portion to approximately its center along the central axis of the plunger 210.

The plunger 210 is urged forward and held against the venturi 164 by means of a pair of springs. A helical coil spring 214 to the immediate rear of the plunger 210 rests upon a coil spring support 215 of a Belville spring 216. The Belville spring 216 is attached to a sliding Belville spring support 218 which holds the Belville spring 216 in place and acts as a pressure adjustment plate. The support 218 and the Belville spring 216 with its coil spring support 215 have holes 220, 222 (respectively) in their centers that are coaxial with themselves, the coil spring 214, and the rear plunger hole 212.

The Belville spring 216 is attached along its edge to the Belville spring support 218. The spring coil 214 is attached to the Belville spring 216 at the center of the Belville spring 216 to a coil spring support 215. The coil spring 214 extends upwardly to attach to the rear end of the plunger 210. By means of both the Belville spring 216 and the coil spring 214, the plunger 210 is urged against but is able to move away from and back to the venturi 164 so that water flow is allowed or prevented according to the water pressure present at the venturi 164.

Connected to central valve chamber 224 near the venturi apex 208 is a vacuum pickup 162 or venturi output 162. The venturi output 162 is connected to end 160 of the air impervious tube 144 of the pressure sensitive valve control 100. The venturi output 162 is located close to the venturi 164 so that the vacuum created by that venturi 164 is communicated to the venturi output 162 and transmitted to the other parts of the water control apparatus of the present invention.

The Belville valve chamber 224 is sealed below the Belville spring support 218 by a block of material 220. A threaded adjusting bolt or screw 230 passes through this block 220 and into the valve chamber 224. A seal between the adjusting bolt 230 and the Belville valve chamber 224 is provided by an O-ring 231 fitting about the adjusting bolt 230. The threaded end 232 of the adjusting bolt 230 does not pass further than the Belville spring support 218 which rests upon the end of the adjusting bolt 230. The adjusting bolt 230 has an extension pin 234 extending from its threaded end 232 that ensures properly aligned movement of the plunger 210 and the springs 214, 216 within the Belville valve chamber 224. This extension pin 234 fits into the plunger hole 212.

The adjusting bolt 230 is adjustable from the exterior of the Belville control valve 200. The extension pin 234 attached to the threaded end 232 of the adjusting bolt 230 passes through the holes or spaces present in the Belville spring support 218, the Belville spring 216, the coil spring 214, and on into the plunger 210.

The adjusting bolt 230 controls the location of the Belville spring support 218 which slides within the Belville valve chamber 224. By adjusting the position of the Belville spring support 218, the total force of the Belville and coil springs 216, 214 upon the plunger 210 ca be adjustably controlled. When the Belville spring support 218 is moved closer to the plunger 210, more total spring force presses and urges the plunger 210 towards the venturi 164. When the Belville spring support 218 is moved away from the plunger 210, less total spring force presses and urges the plunger 210 towards the venturi 164. With greater or lesser spring force pressing the plunger 210 towards the venturi 164, greater or lesser water pressure is required to overcome this spring force to press the plunger 210 back into the Belville valve chamber 224 and open the Belville valve assembly 200 to water flow.

Figure 7:
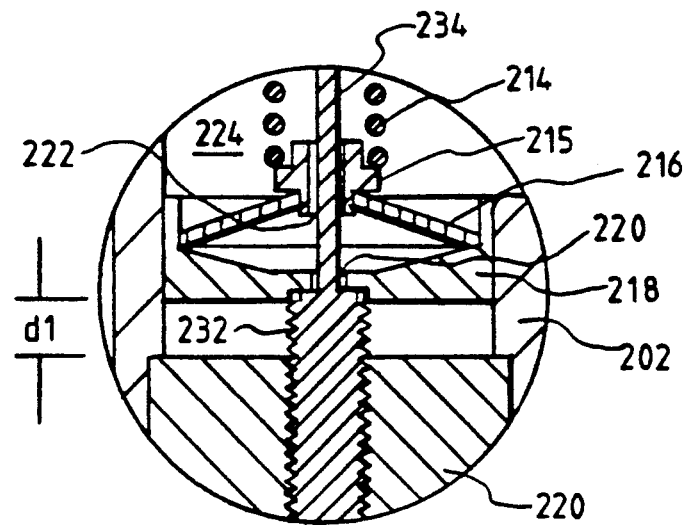
FIG. 7 is a cross-sectional view of the sliding Belville spring support section of the pressure-sensitive water valve in an upwardly adjusted position.
Figure 8:
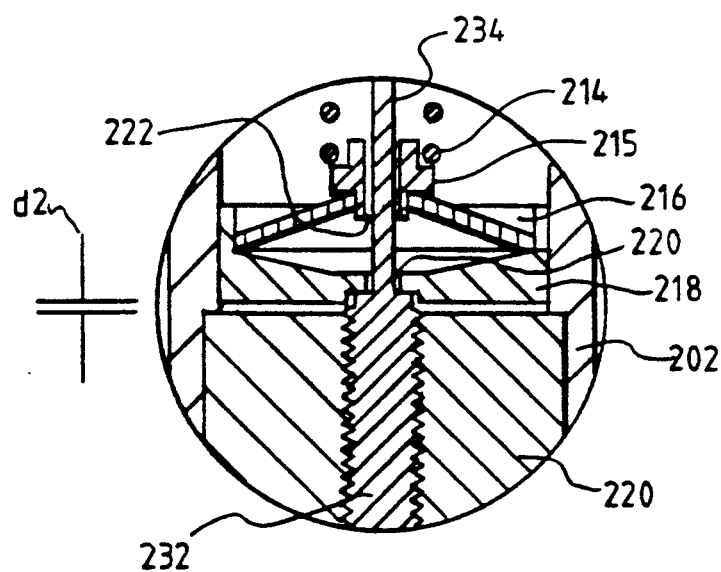
FIG. 8 is a cross-sectional view of the sliding Belville spring support section of the pressure-sensitive water valve in a downwardly adjusted position.

As shown in FIGS. 7 and 8, threading the adjusting bolt 230 into the Belville valve assembly 200 moves the sliding Belville spring support 218 further into the valve chamber 224, increases the water pressure threshold required to open the Belville valve assembly 200, and allows a smaller volume of water to pass through it per unit time. Unthreading the adjusting bolt 230 from the Belville valve assembly 200 allows the Belville spring support 218 to move further out from the Belville valve chamber 224, decreases the water pressure threshold required to open the Belville valve assembly 200, and increases the water volume passing through it per unit time.

When a series of water distribution control elements such as sprinklers or irrigators are connected to a single water supply such as a water line or a faucet, the simultaneous flow through each element can reduce water pressure dramatically. Such low water pressure can inhibit proper water flow especially when water control devices are used that depend upon the water pressure, or a vacuum pulled by the water pressure, such as the present device. The Belville valve assembly 200 is intended for use in conjunction with the main valve assembly 10 and valve control 100 of the present invention and/or similar vacuum activated water control systems such as the Automatic Water Control Apparatus of U.S. Pat. No. 4,987,915.

The Belville valve assembly 200 of present invention allows a series of water distribution elements such as sprinklers incorporating venturi- or vacuum-activated components to be attached to a single water supply without each water distribution element turning on simultaneously to drastically and detrimentally reduce the water pressure.

Referring to FIGS. 4 and 5, when water pressure is applied to the Belville valve assembly 200 of the present invention, the water pressure exerts a force against the venturi 164 and the plunger 210. When the water pressure is below a certain threshold, the plunger 210 is held against the venturi 164 by the springs, 214, 216 preventing the flow of water through the Belville valve assembly 200. When the water pressure exceeds that threshold, the plunger 210 is pressed back into the Belville valve chamber 224 by the water pressure and the springs 214, 216 are compressed.

When the water pressure reaches that certain valve-opening threshold level, the Belville spring 216 snaps back so that it lies closer to the Belville spring support 218. Without the supporting force provided by the two springs 214, 216, the plunger 210 gives way to the upstream water pressure. The water pressure pushes the plunger 210 into the valve chamber 224 until it is stopped by the counterbalancing force of the two springs 214, 216. Water is then allow to flow through the venturi 164 and past the plunger 210 creating a region of low pressure LP near both the venturi 164 and the apex 208 of the venturi.

This region of low pressure LP is created by the venturi 164 as the venturi 164 increases the speed of the water flowing past it by restricting the area through which the water can flow. This faster water flow reduces the pressure in the area adjacent to the faster water flow. This region of low pressure LP generated by the venturi 164 includes the venturi apex 208 and the area of the venturi output 162. Low pressure in the form of a vacuum is transmitted by the venturi output 162 to the valve control 100, but may be used with other apparatus or devices such as the Automatic Water Control Apparatus of the previously mentioned patent.

When water initially begins to flow past the plunger 210, a drop in water pressure occurs that would normally allow the plunger 210 to fit back into its closed position against the venturi 164. Through the use of the Belville spring 216, this reduction in water pressure is not sufficient to allow the plunger 210 to go back into place. Just as there is a higher water pressure threshold for opening the Belville valve assembly 200 by pushing the plunger 210 into the valve chamber 224, there is also another, different, and lower water pressure threshold that allows the plunger 210 to fit back into place to close the Belville valve assembly 200 and shut off the flow of water.

This difference in threshold water pressures for beginning and ending water flow is due to the fact that the force exerted by the Belville spring 216 on the plunger 210 is greater when the Belville spring 216 is up and away from the Belville spring support 218 than when the Belville spring 216 is snapped back toward the Belville spring support 218. The initial higher starting water pressure is needed to push the Belville spring 216 back towards the Belville spring support 218. Once the Belville spring 216 is so pushed back, a pressure lower than the pressure of the water flowing past the plunger is required to allow the plunger 210 to seat itself against the venturi 164 and stop the flow of water through the Belville valve assembly 200.

In order to reach this second, lower water pressure threshold, the main water valve assembly 10 shuts off the flow of water to the Belville valve 200 when the appropriate conditions are met (soil moisture/sufficient low pressure in the valve control 100). When the main water valve assembly 10 shuts off the water flow, almost no water pressure is exerted against the plunger 210. In the absence of water pressure, the Belville spring 216 is able to push away from the Belville spring support 218 to seat the plunger 210 back against the venturi 164. At a later time, such as when the moisture sensor dries, the main water valve assembly 10 will permit water to flow past the main valve 11 to and exert pressure against the plunger 210, starting the cycle all over again.

The coil spring 214 allows adjustment of the Belville valve assembly 200 by mediating the changes in pressure and position between the Belville spring 216 and the plunger 210. The coil spring 214 is easier to adjust than the Belville spring 216 as Belville springs generally have a very small range through which they can be adjusted. The pressure exerted by the springs 214, 216 against the plunger 210 is adjustable by means of the adjusting bolt 230 that controls the position of the sliding Belville spring support 218. When the adjusting bolt 230 is moved inward toward the valve chamber 224, greater pressure is applied to the plunger 210 by the springs 214, 216. When the adjusting bolt 230 is moved outward, lesser pressure is applied to the plunger 210 by the springs 214, 216. According to the force of the springs upon the plunger 210, corresponding greater or lesser threshold water pressures are required to open and close the Belville valve assembly 200.

It is contemplated that the sliding Belville spring support 218 is adjustable through a distance of 0.150 inches within the Belville valve chamber 224. The distance through which the plunger 210 moves is contemplated to be 0.050 inches to provide a gap between the plunger 210 and the venturi 164 of 0.075 inches.

The motion of the plunger 210 as it travels to and from the venturi 164 provides a self-purging effect so that particle contaminants, detritus and the like may not interfere with water flow through the venturi 164.

When a large number of water distribution devices such as sprinklers are connected to a single water supply, the water valve apparatus in the present invention allows each individual water distribution apparatus to operate independently according to the available water pressure. Only when there is sufficient pressure and a dry moisture sensor will water flow through the water control apparatus of the present invention to an attached water distribution element, such as a sprinkler, irrigator, or pool-filler (none shown). The water valve/water control apparatus of the present invention is intended to be attached to each water distribution device. The water control apparatus of the present invention allows water distribution in a individual manner where each water distribution element operates so that at least a minimum water pressure is maintained. In this way, not all water distribution elements operate at once, and a dramatic decrease in water pressure is avoided.

For example, assume there are sixty pounds per square inch (sixty pounds) of water pressure on the line and two sprinklers are connected that draw thirty-five pounds. If the present invention were used on each sprinkler and the water supply was turned on, the water pressure would allow one of the two sprinklers to water the ground until its moisture sensor was wet. That sprinkler would then shut off and the other would turn on until its moisture sensor was wet. If the Belville valve assemblies were each adjusted to open at thirty pounds, the opening of one Belville valve for one sprinkler would reduce the water pressure to twenty-five pounds, preventing the other sprinkler from turning on until thirty pounds of pressure were available, either from the first one ending its watering or increased line pressure. Additional sprinklers with additional water controls could be added indefinitely, always maintaining at least thirty pounds of pressure on the water supply line.

In FIGS. 1 and 2, the main valve assembly 10 is connected at its input WI to a source of water under pressure such as direct connection with a water supply or an outdoor faucet. Its outlet is connected to the Belville valve assembly 200. The moisture sensor 152, which is connected to the chamber 112 by the tube 144, is inserted in the ground in the location to be watered or at the desired water level of the pool.

The main valve 11 is initially in a closed condition so that water is not permitted to exert pressure on the venturi device 164. When the moisture sensor 152 becomes dry, the diaphragm 104 descends within the valve control 100 and opens up the pilot chamber 36 by raising the magnetic plug 126. With the pilot chamber 36 open, the main valve assembly 10 also opens and with water flowing past the valve 11, the operation of the present invention is as follows.

Water flows past the main valve 11 to exert pressure upon the plunger 210. If the water pressure is sufficient, the plunger 210 is pressed sufficiently hard to snap the Belville spring 216 back into its compressed position (FIGS. 2, 6). When the Belville spring 216 snaps back, the plunger 210 gives way to the water pressure and recedes back into the Belville valve chamber 224 along the extension pin 234. Water then flows through the Belville valve assembly 200, including past the venturi 164, and onto a water distribution device such as a sprinkler or pool water supply (both not shown) through the water outlet WO.

When the main valve 10 and Belville valve 200 assemblies are open, water passing through the venturi device 164 creates an area of low pressure LP that pulls on the high air resistance element 166, the check valve 168, and the tube 144. The suction created by the venturi device 164 is sufficiently strong to pull air through the high air resistance element 166 and the tube 144 so as to draw air out of the upper valve control chamber 112. If the moisture sensor 152 is wet, then the suction created by the venturi device is enough to create an area of low pressure above the diaphragm 104 in the upper valve control chamber 112. This low pressure area gradually increases in strength as water continues to flow through the venturi 164. Ultimately, the low pressure area causes the diaphragm 104 to lift up, overcoming the downward force of the helical spring 116 and the attractive force between the magnetic plug 126 and the magnet 108 of the diaphragm 104.

When the diaphragm 104 ascends within the valve control 100, it pulls the magnet 108 away from the magnetic plug 126. When the magnet 108 is pulled away from the magnetic plug 126, the attraction between the two is broken and the magnetic plug 126 drops down into the pilot chamber 36, aided by the downward urging of the spring 132. The magnetic plug 126 closes off the pilot chamber inlet 32 from the pilot chamber 36 and water ceases to flow to the chamber 19 and to the underside of piston 18. The piston 18 is then forced downward by the main valve spring 30, closing the main valve 11.

When the flow of water ceases, the water pressure is near zero, allowing the plunger 210 of the Belville valve assembly 200 to reseat itself against the venturi 164 with the venturi 164 ceasing to exert a vacuum on the tube 144. The check valve 168 prevents air or water from entering the system and depleting the low pressure area to maintain the diaphragm 104 in an upward position.

When the moisture sensor 152 dries out, air is permitted to enter the tube 144 and the upper valve control chamber 112 through the moisture sensor 152. The reduced pressure previously created by the venturi 164 is depleted by the inflow of air from the moisture sensor 152, causing the diaphragm 104 to descend as it is biased downward by the valve control spring 116. The magnet 108 follows the diaphragm 104 down and exerts an upward force upon the magnetic plug 126 that overcomes the downward biasing force of the plug spring 132. The magnetic plug 126 then ascends within the pilot chamber 36, breaking the seal maintained over the inlet 32 of the pilot chamber 36. Water begins to flow into the pilot chamber 36 and the chamber 19, lifting the piston 18 and opening up the main water valve 11. Water then flows past the valve 11 and valve seat 31 and exerts pressure upon the venturi 164 and Belville valve assembly 200, opening the Belville valve assembly 200 if the water pressure is sufficient. As long as the moisture sensor 152 remains sufficiently dry, air continues to flow into the upper valve control chamber 112 while the main valve 11 and the Belville valve assembly are held open When the Belville valve assembly 200 opens, water flows through the main valve assembly 10, through the venturi device 164, and through the Belville valve assembly 200 to the main outlet WO and to a sprinkler or pool watering system (both not shown). This cycle is repeated as the ceramic element dries and then gets wet again.

Figure 9:
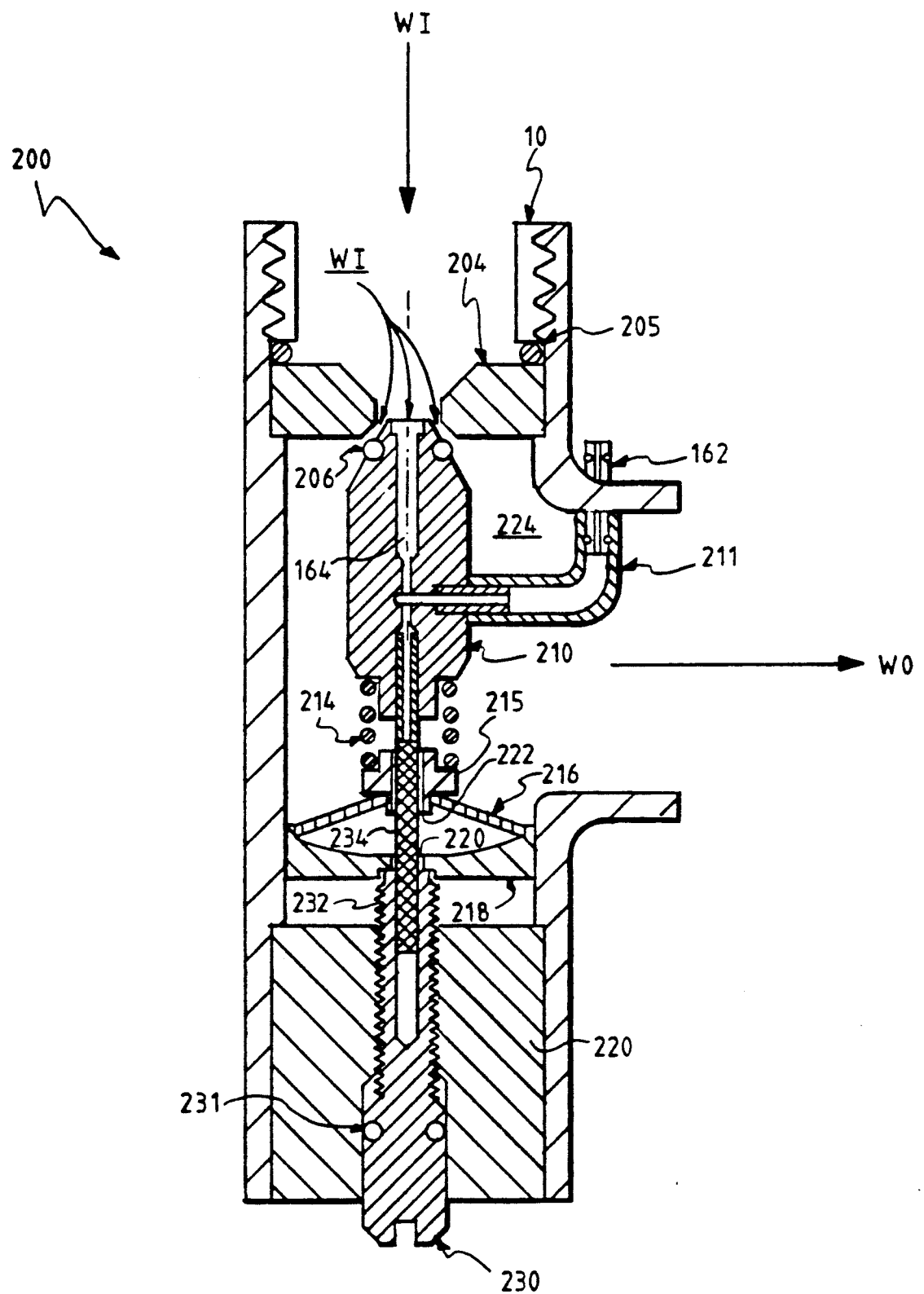
FIG. 9 is a cross sectional view of an alternative embodiment of the Belville valve assembly of the present invention in a closed position.
Figure 10:
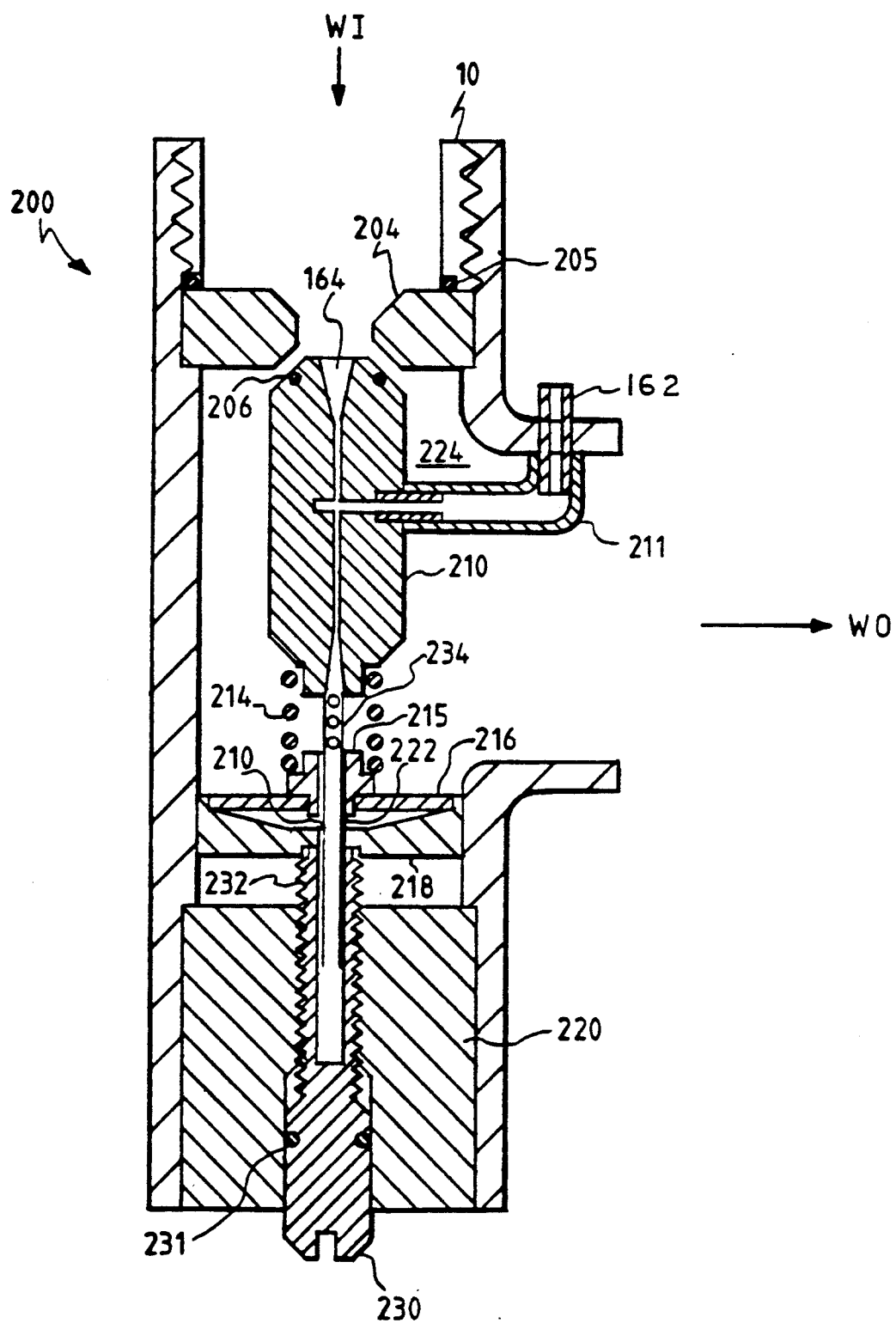
FIG. 10 is a cross sectional view of an alternative embodiment of the Belville valve assembly of the present invention in an open position.

FIGS. 9 and 10 show respectively the closed and open positions of an alternative embodiment of the Belville valve assembly 200. In this alternative embodiment, the venturi 164 is located within the plunger 210 that seats itself in a valve orifice 204 having an O-ring 205. The plunger 210 maintains its seal with the valve orifice 204 by means of an O-ring 206 about its front end. The plunger 210 is connected to the pin 234 which moves within the adjusting bolt 230.

The venturi 164 in the plunger 210 is connected to the venturi output 162 by means of a connector 211. The connector 211 is sufficiently flexible so that the connection between the venturi 164 and the venturi output 162 is maintained despite the movement of the plunger 210 within the Belville valve chamber 224.

Water flows through the venturi 164 within the plunger 210 and out the base of the plunger 210 through the pin 234. So long as the main valve assembly 10 is open, water flows through the venturi 164 which pulls a vacuum on the venturi output 162 and the air impervious tube 144. This alternative embodiment of the Belville valve assembly 200 provides a small vacuum pull on the tube 144 even when the Belville valve assembly 200 is closed if the main valve assembly 10 is open. For the most part, the operation of the alternative embodiment of the Belville valve assembly 200 shown in FIGS. 9 and 10 is the same as the first embodiment.

While the present invention has been described with regards to particular embodiments, it is recognized that additional variations of the present invention may be devised without departing from the inventive concept.

An example of such a variation is the alternative placement of the diaphragm spring 116 or the magnetic plug spring 132. Instead of placing the diaphragm spring 116 in the upper valve control chamber 112, the diaphragm spring 116 could be placed in the lower valve control chamber 114. The diaphragm spring 116 would then pull the diaphragm 104 down instead of pushing it down in order to downwardly bias the diaphragm 104. Similarly for the magnetic plug spring 132, the magnetic plug spring 132 could be located within the valve control cavity 118 or the pilot chamber 36 to pull down upon and bias the magnetic plug 126.

Another example of a variation not departing from the inventive concept set forth herein is the replacement of the Belville spring 216 and helical coil spring 214 by just one single spring, either a Belville spring 216 or a helical coil spring 214.

What I claim is:

1. A valve control for a water valve operable without an external power supply controlled by a pilot chamber, comprising:

a permanent magnetic diaphragm, said magnetic diaphragm biased to a lower position;

a permanent magnetic plug, said magnetic plug coupled to said magnetic diaphragm, said magnetic plug opening and closing said pilot chamber in response to said magnetic diaphragm, said magnetic plug biased to a lower position but is maintained in a higher position when said magnetic diaphragm is in said lower position;

a housing separated into a first upper chamber and a second lower chamber by said magnetic diaphragm, said first upper chamber and said second lower chamber in airtight separation from one another, air pressure within said first upper chamber varying and air pressure within said second lower chamber maintained at ambient by an aperture defined in said housing;

a moisture sensor responsive to the presence or absence of moisture connected to said first upper chamber, said moisture sensor comprising a porous air-flow element, said moisture sensor preventing air-flow through said porous element upon detecting sufficient moisture; and a venturi connected to said first upper chamber; whereby when fluid passes through said venturi, air pressure is reduced in said first upper chamber if said moisture sensor detects sufficient moisture.

2. A valve control for a water valve operable without an external power supply controlled by a pilot chamber, comprising:
   a permanent magnetic diaphragm; and
   a permanent magnetic plug, said magnetic plug coupled to said magnetic diaphragm, said magnetic plug opening and closing said pilot chamber in response to said magnetic diaphragm.

3. The valve control of claim 2, wherein said valve control further comprises:
   a housing separated into a first upper chamber and a second lower chamber by said magnetic diaphragm, said first upper chamber and said second lower chamber in airtight separation from one another, air pressure within said first upper chamber varying and air pressure within said second lower chamber maintained at ambient by an aperture defined in said housing.

4. The valve control of claim 2, wherein said magnetic diaphragm is spring biased to a lower position and said magnetic plug is spring biased to a lower position.

5. The valve control of claim 4, wherein said magnetic diaphragm is spring biased in said lower position, said magnetic plug is maintained in a higher position.

6. The valve control of claim 2, further comprising:
   a moisture sensor responsive to the presence or absence of moisture connected to said first upper chamber, said moisture sensor comprising a porous air-flow element, said moisture sensor preventing air-flow through said porous element upon detecting sufficient moisture; and
   a venturi connected to said first upper chamber; whereby
   when fluid passes through said venturi, air pressure is reduced in said first upper chamber if said moisture sensor detects sufficient moisture.

7. An automatic control for controlling the flow of water through a system comprising:
   a main water valve;
      control means for controlling said main water valve, said control means connected to said main water valve and capable of opening and closing said main water valve;
      a moisture sensor connected to said control means, said control means responding to said moisture sensor by opening and closing said main water valve; and
   a second water valve means connected to said main water valve, said second water valve means sensitive to water pressure and opening when a high water pressure is present and closing when a low water pressure is present, said second water valve means comprising a venturi, a plunger, said plunger defining a cavity having an opening at a rear end of said plunger, and a Belville spring coupled to said plunger and pushing said plunger against said venturi.

8. The automatic water control of claim 7, whereby when water pressure against said plunger exceeds a high threshold, the water valve opens and remains open until said water pressure falls below a low threshold.

9. The automatic water control of claim 19, further comprising:
   a coil spring, said coil spring coupled to said plunger on one end and said Belville spring at another end.

10. The automatic water control of claim 7, further comprising:
    an adjusting bolt, said adjusting bolt adjustable from the exterior of the water valve;
    an extension pin, said extension pin connected to said adjusting bolt and passing into said cavity defined by said plunger; and
    a sliding Belville spring support, said sliding support adjusted by said adjusting bolt and controlling the distance between said plunger and said Belville spring.

11. The automatic water control of claim 7, further comprising:
    a venturi output, said venturi output located in sufficient proximity to said venturi whereby a reduction in pressure created near said venturi is transmitted to and communicated by said venturi output.

12. The automatic water control of claim 7, wherein said Belville spring exerts more force on said plunger when said valve is closed and less force on said plunger when said valve is open.

13. The automatic water control of claim 7, wherein said main water valve control means comprises:
    a magnetic diaphragm; and
    a magnetic plug coupled to said magnetic diaphragm, said magnetic plug opening and closing said pilot chamber in response to said magnetic diaphragm.

14. The automatic water control of claim 13, wherein said valve control further comprises:
    a housing separated into a first upper chamber and a second lower chamber by said magnetic diaphragm, said first upper chamber and said second lower chamber in airtight separation from one another, air pressure within said first upper chamber varying and air pressure within said second lower chamber maintained at ambient by an aperture defined in said housing.

15. The automatic water control of claim 13, wherein said magnetic diaphragm is spring biased to a lower position and said magnetic plug is spring biased to a lower position.

16. The automatic water control of claim 15, wherein when said magnetic diaphragm is spring biased in said lower position, said magnetic plug is maintained in a higher position.

17. The automatic water control of claim 13, further comprising:
    a moisture sensor connected to said first upper chamber; and
    a venturi connected to said first upper chamber; whereby
    when fluid passes through said venturi, air pressure is reduced in said first upper chamber if said moisture sensor detects sufficient moisture.

18. A pressure-sensitive water valve for use in a water distribution system such as one used for irrigation, comprising:
    a valve orifice;
    a plunger, said plunger having a venturi and an extension pin;
    a Belville spring coupled to said plunger and pushing said plunger against said valve orifice, said Belville spring exerting more force on said plunger when said valve is closed and less force on said plunger when said valve is open;
    a coil spring, said coil spring coupled to said plunger on one end and said Belville spring at another end;

an adjusting bolt, said adjusting bolt defining a cavity in which said extension pin moves, said adjusting bolt adjustable from the exterior of the water valve;

a sliding Belville spring support, said sliding support adjusted by said adjusting bolt and controlling the distance between said plunger and said Belville spring; and a vacuum pickup, said vacuum pickup coupled to said venturi whereby a reduction in pressure created by said venturi is transmitted to and communicated by said vacuum pickup.

19. The water valve of claim 18, whereby when water pressure against said plunger exceeds a high threshold, the water valve opens and remains open until said water pressure falls below a low threshold.

20. The water valve of claim 18, wherein said plunger has an extension pin extending into a cavity defined by an adjusting bolt.

21. A pressure-sensitive water valve for use in a water distribution system such as one used for irrigation, comprising:

a venturi;

a plunger, said plunger defining a cavity having an opening at a rear end of said plunger and controlling flow through said venturi;

a Belville spring coupled to said plunger and pushing said plunger against said venturi, said Belville spring exerting more force on said plunger when said valve is closed and less force on said plunger when said valve is open;

a coil spring, said coil spring coupled to said plunger on one end and said Belville spring at another end;

an adjusting bolt, said adjusting bolt adjustable from the exterior of the water valve;

an extension pin, said extension pin connected to said adjusting bolt and passing into said cavity defined by said plunger a sliding Belville spring support, said sliding support adjusted by said adjusting bolt and controlling the distance between said plunger and said Belville spring; and a venturi output, said venturi output located in sufficient proximity to said venturi whereby a reduction in pressure created near said venturi is transmitted to and communicated by said venturi output.

22. The water valve of claim 21, whereby when water pressure against said plunger exceeds a high threshold, the water valve opens and remains open until said water pressure falls below a low threshold.

23. The water valve of claim 21, wherein said plunger defines a cavity having an opening at a rear end of said plunger.

24. The water valve of claim 21, wherein said Belville spring exerts more force on said plunger when said valve is closed and less force on said plunger when said valve is open.

* * * * *